United States Patent
Backhaus-Ricoult et al.

(10) Patent No.: US 9,027,334 B2
(45) Date of Patent: May 12, 2015

(54) TROUGH FILTER WITH INTEGRATED THERMOELECTRIC GENERATOR, VEHICLE INCLUDING TROUGH FILTER, AND METHOD OF TREATING EXHAUST GAS

(71) Applicants: Monika Backhaus-Ricoult, Horseheads, NY (US); Thomas Dale Ketcham, Horseheads, NY (US)

(72) Inventors: Monika Backhaus-Ricoult, Horseheads, NY (US); Thomas Dale Ketcham, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 424 days.

(21) Appl. No.: 13/690,186

(22) Filed: Nov. 30, 2012

(65) Prior Publication Data
US 2014/0150413 A1   Jun. 5, 2014

(51) Int. Cl.
*F01N 5/02* (2006.01)
*F01N 3/033* (2006.01)

(52) U.S. Cl.
CPC ............... *F01N 5/025* (2013.01); *Y02T 10/22* (2013.01); *Y02T 10/16* (2013.01); *F01N 3/033* (2013.01)

(58) Field of Classification Search
CPC ..... F01N 3/0217; F01N 3/033; F01N 3/2013; F01N 3/2046; F01N 3/2882; F01N 3/2889; F01N 5/02; F01N 5/025; F01N 2240/02; F01N 2240/04; F01N 2260/02; F02G 5/02; B01D 29/54; B01D 53/9477; H01L 35/32; Y02T 10/16; Y02T 10/166
See application file for complete search history.

(56) References Cited

U.S. PATENT DOCUMENTS

| | | | |
|---|---|---|---|
| 5,824,232 A | 10/1998 | Asher et al. | 210/787 |
| 5,968,456 A | 10/1999 | Parise | 422/174 |
| 6,096,966 A | 8/2000 | Nishimoto et al. | 136/205 |
| 6,136,189 A | 10/2000 | Smith et al. | 210/266 |
| 6,569,330 B1 | 5/2003 | Sprenger et al. | 210/315 |
| 7,523,607 B2 | 4/2009 | Sullivan | 60/320 |
| 7,687,704 B2 | 3/2010 | Shimoji et al. | 136/205 |
| 2002/0141910 A1 | 10/2002 | Adiletta | 422/171 |
| 2010/0006494 A1 | 1/2010 | Scher et al. | 210/484 |
| 2011/0041469 A1 | 2/2011 | Fischer et al. | 55/498 |
| 2011/0146743 A1 | 6/2011 | Oesterle et al. | 136/210 |
| 2011/0311421 A1 | 12/2011 | Backhaus-Ricoult et al. | 423/213.2 |
| 2012/0012146 A1* | 1/2012 | Salzgeber | 136/205 |

FOREIGN PATENT DOCUMENTS

JP   2008-223758   9/2008

* cited by examiner

*Primary Examiner* — Kenneth Bomberg
*Assistant Examiner* — Jonathan Matthias
(74) *Attorney, Agent, or Firm* — Michael Russell

(57) ABSTRACT

A trough filter integrated with a thermoelectric generator includes annular filter modules having a support structure at its inner circumference, a filter element, and a support structure at its outer circumference. The filter elements may be configured to form troughs. An annular exhaust gas outlet channel or gas inlet channel may be formed between filter modules. The thermoelectric generator may be positioned in the exhaust gas outlet or inlet channel. A vehicle includes the trough filter integrated with a thermoelectric generator downstream from an internal combustion engine. A method of treating exhaust gas uses a trough filter with an integrated thermoelectric generator.

24 Claims, 7 Drawing Sheets

TROUGH FILTER WITH INTEGRATED THERMOELECTRIC GENERATOR, VEHICLE INCLUDING TROUGH FILTER, AND METHOD OF TREATING EXHAUST GAS

BACKGROUND

1. Field

The present disclosure relates to an exhaust gas after-treatment unit such as a diesel or gas particulate filter or catalyzed substrate with a thermoelectric generator integrated therein. The exhaust gas after-treatment unit may be included in the exhaust system of a vehicle.

2. Technical Background

Thermoelectric generators may be used in vehicles to convert heat from exhaust gas into electrical power, which may be used in other systems of the vehicle or stored in a battery. Various locations and designs of thermoelectric generators have been used. However, conventional designs of thermoelectric generators may be difficult to place in an exhaust system due to size constraints, increased resulting mass in the exhaust system and resulting back-pressure issues. Accordingly, there is a need for a thermoelectric generator that may be efficiently integrated into the exhaust system of a vehicle without creating an undue increase in back-pressure.

BRIEF SUMMARY

The concepts of the present disclosure are generally applicable to thermoelectric generators. In accordance with one embodiment of the present disclosure, a trough filter integrated with a thermoelectric generator may include several annular filter modules, such as a first annular filter module comprising a first support structure at its inner circumference, a filter element, and a second support structure at its outer circumference. The trough filter may also include a second annular filter module comprising a third support structure at its inner circumference, a filter element, and a fourth support structure at its outer circumference. The filter elements may be configured to form troughs, and the first and second filter modules may be concentric. An inner diameter of the second filter module may be larger than an outer diameter of the first filter module, such that an annular exhaust gas outlet channel may be formed between the first filter module and the second filter module, i.e., by way of a gap between the second support structure and the third support structure. The thermoelectric generator may be positioned in the exhaust gas channel. The exhaust gas channel may be a gas inlet channel or a gas outlet channel. The thermoelectric generator may include a first heat exchanger connected to the second support structure, a second heat exchanger, a first thermoelectric module positioned between the first heat exchanger and the second heat exchanger, a third heat exchanger connected to the third support structure, and a second thermoelectric module positioned between the second heat exchanger and the third heat exchanger.

In accordance with another embodiment of the present disclosure, a vehicle may include an internal combustion engine, and a trough filter integrated with a thermoelectric generator as described above. The vehicle may further comprise an exhaust gas outlet running from the internal combustion engine through the trough filter. The trough filter may be positioned downstream of the internal combustion engine.

In accordance with an embodiment of the present disclosure, a method for converting heat into energy may include flowing hot gas through a trough filter as described above. The method may further include exchanging heat between the flowing exhaust gas and at least one thermoelectric generator as described above.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

According to an exemplary embodiment, a trough filter with an integrated thermoelectric generator generally may comprise multiple concentric filter elements and an annular exhaust gas outlet channel located between one or more of the elements, along a central axis of the generator or at a peripheral channel. The thermoelectric generator may be positioned in thermal communication with the annular exhaust gas inlet or outlet channel. The thermoelectric generator may include hot-side heat exchangers, cold-side heat exchangers, and thermoelectric modules. The trough filter with an integrated thermoelectric generator may be included in an after-treatment system of a vehicle.

By incorporating a thermoelectric module in thermal communication with the annular exhaust gas channel, greater conversion efficiencies may be achieved. In addition, placement of the thermoelectric module in thermal communication with the annular exhaust gas channel may advantageously promote homogenization of the overall after-treatment device temperature during its operation, particularly an after-treatment device constructed with low thermal conductivity materials, thereby also significantly widening the operation window of the after-treatment system.

Figure 1:
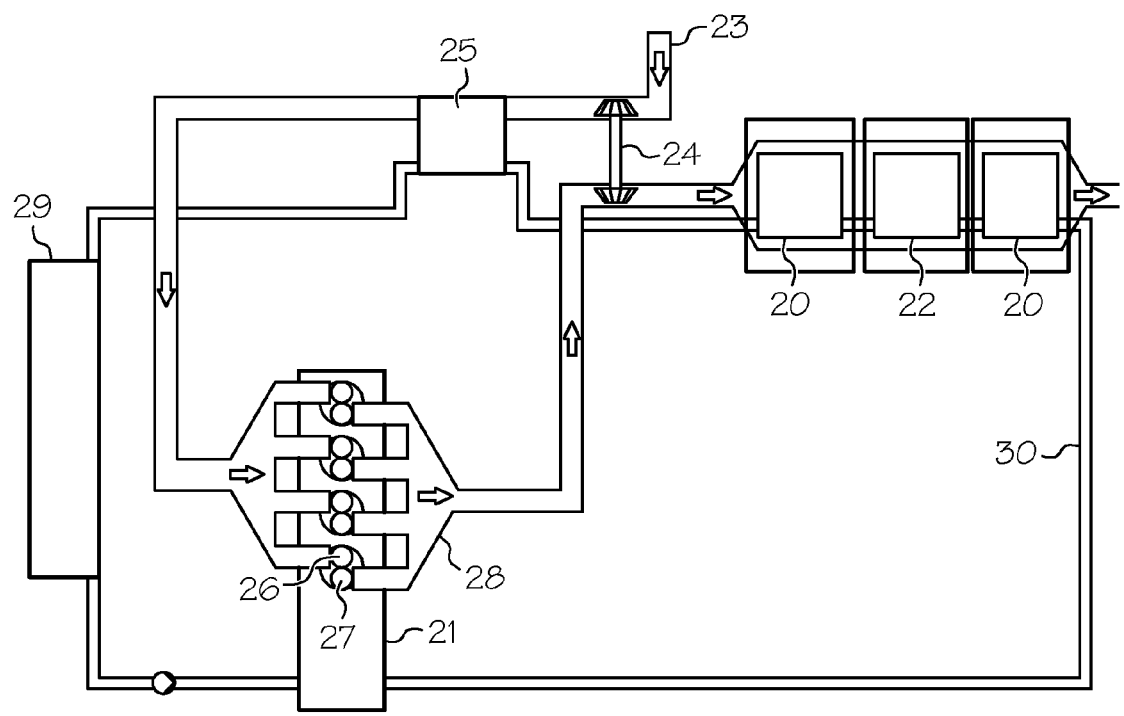
FIG. 1 is a schematic showing exemplary types and exemplary orders of after-treatment devices in a gasoline engine.

In vehicles with a gasoline engine, for example, exhaust gas may pass through one or more three-way catalyst (TWC) substrates. As illustrated schematically in FIG. 1, gasoline after-treatment systems may include a TWC substrate 20 that may be close-coupled to an engine 21, along with another underbody TWC substrate 20 further downstream. A gasoline particulate filter (GPF) substrate 22 may also be provided. A GPF may be functionalized with a de-NOx SCR catalyst and/or an oxidation catalyst (e.g., CO oxidation catalyst). In embodiments, during operation of engine 21, air may enter via an air intake 23, may be compressed by a turbocharger 24, cooled by an inter-cooler 25, and passed through intake valves 26 into the engine's cylinders. After adding and igniting fuel, exhaust gas may emerge from exhaust valves 27, may be combined in an exhaust manifold 28, used to spin the turbocharger 24 (if present), and passes through the TWCs 20 and GPF 22.

The thermal mass of the TWC 20 and/or the GPF 22 may allow heat storage from exhaust gas passing through an exhaust system, and engine coolant may be, for example, routed through the after-treatment system from a radiator 29 via a coolant pipe 30 to act as a heat sink. In some embodiments, the GPF 22 may be a trough filter, such as the trough filter described in more detail below.

Figure 2:
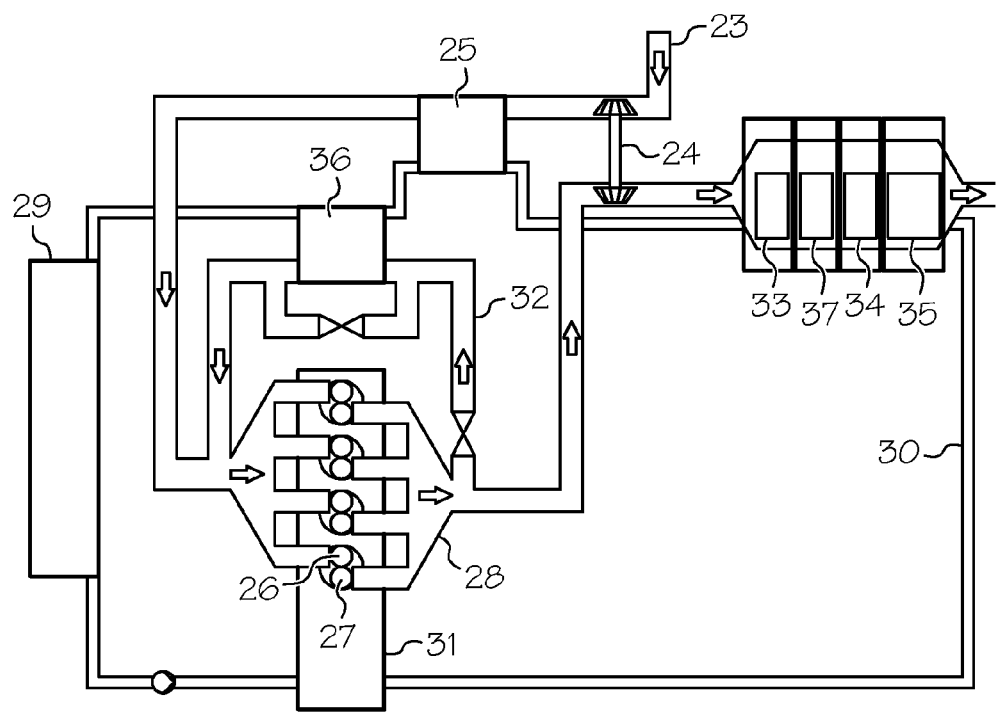
FIG. 2 is a schematic showing exemplary types and exemplary orders of after-treatment devices in a diesel engine.

Referring now to FIG. 2, during operation of a diesel engine 31, part of the exhaust gas that emerges from the exhaust manifold 28 is directed to the intake valves 26 (i.e., through an exhaust gas recirculation loop (EGR) 32, which may pass through an EGR cooler 36). The remaining exhaust gas may pass through a series of after-treatment elements. Catalyst substrates may include, for example, a diesel oxidation catalyst (DOC) substrate 33, a selective catalytic reduction (SCR) catalyst substrate 34, and an ammonia slip catalyst substrate 35. In various exemplary embodiments, a diesel vehicle may also substitute a lean NOx trap (LNT) for the SCR and ammonia slip catalyst substrates. Catalyst substrates may often be composed of a cellular ceramic or metal, which may be coated with the catalytic material.

In embodiments, the diesel engine 31 may also include a diesel particulate filter (DPF) substrate 37. The DPF substrate 37 may be made using various porous cellular ceramic substrates whose ends are plugged in a checkerboard fashion, or by using a partial flow filter made, for example, of corrugated metal sheets. In some embodiments, the DPF substrate 37 may be a trough filter, such as the trough filter described in more detail below. The DPF may be functionalized with de-NOx SCR catalyst and/or DOC catalyst.

As with the gasoline engine above, the thermal mass of the catalyst substrates 33, 34 and 35 and/or the DPF substrate 37 may store heat from exhaust gas passing through the after-treatment system and serve as a (modulated, and by the hot exhaust gas continuously replenished) heat supply. Engine coolant may be, for example, routed through the after-treatment system from a radiator 29 via a coolant pipe 30 to act as a heat sink.

As used herein, a "substrate" or an "after-treatment substrate" includes, but is not limited to, catalytic substrates and particulate filters that are intended to remove pollutants from engine exhaust gas. Substrates may include, for example, a porous body made from various metal and ceramic materials, including, but not limited to, cordierite, silicon carbide (SiC), silicon nitride, aluminum titanate (AT), eucryptite, mullite, calcium aluminate, zirconium phosphate and spodumene. A "catalyst substrate" may include, for example, a porous body, such as a TWC, DOC or SCR, which may be infiltrated with a catalyst that assists a chemical reaction to reduce or eliminate the concentration of various pollutants within the exhaust gas (e.g., carbon monoxide, nitrogen oxides, sulfur oxide, and hydrocarbons). A "particulate filter" may include, for example, a porous body, such as a GPF or DPF substrate, which traps and therefore reduces particulate matter within the exhaust stream (e.g., soot and ash). GPF and DPF can be in addition functionalized with in-pore or on-wall SCR and/or DOC catalyst coatings.

Various substrates of the present disclosure are based on a trough design and may have, within that type of design, any shape or geometry suitable for a particular application, as well as a variety of configurations and designs, including, but not limited to, a flow-through structure, a wall-flow structure, or any combination thereof (e.g., a partial-flow structure). Exemplary flow-through structures include, for example, any structure comprising channels or porous networks or other passages that are open at both ends and permit the flow of exhaust gas through the passages from one end to an opposite end. Exemplary wall-flow structures include, for example, any structure comprising channels or porous networks or other passages with individual passages open and plugged at opposite ends of the structure, thereby enhancing gas flow through the channel walls as the exhaust gas flows from one end to the other. Exemplary partial-flow structures include, for example, any structure that is partially flow-through and partially wall-flow.

In various exemplary embodiments, the substrates, including those substrate structures described above, may be monolithic structures. Various exemplary embodiments of the present disclosure contemplate utilizing the geometry of a trough configuration due to its high surface area per unit volume for deposition of soot and ash. The channels of a trough structure may have virtually any shape; there could be one ring of crowns or several; the interspacing between the crowns can be varied and the flow directions between adjacent crowns can be in the same direction or in counter flow direction. Similarly, a trough-based structure may be configured as either a flow-through structure, a wall-flow structure, or a partial-flow structure.

To recover electricity from waste heat, such as exhaust heat passing through an after-treatment system as shown and described above in FIGS. 1 and 2, the present disclosure contemplates integrating various high-temperature thermoelectric materials within after-treatment substrates. Suitable thermoelectric materials may generally produce a large thermopower when exposed to a temperature gradient. Suitable materials, for example, may exhibit a strong dependency of their carrier concentration on temperature, have high carrier mobility, and low thermal conductivity. Example materials, which may recover a large fraction of heat energy, may have a large Figure of Merit (ZT), defined as $ZT=T*S^2*(\sigma/k)$, wherein T is temperature (in Kelvin), S is the Seebeck coefficient or thermopower (in V/m), $\sigma$ is the electric conductivity (in Siemens/m), and K is the thermal conductivity (in W/mK). The Seebeck voltage describes the potential difference that is established across a material exposed to a temperature gradient. The Seebeck coefficient may be obtained by extrapolating the Seebeck voltage to a vanishing temperature gradient. Depending on the majority carrier type in the material, the Seebeck coefficient may be positive or negative.

Figure 3A:
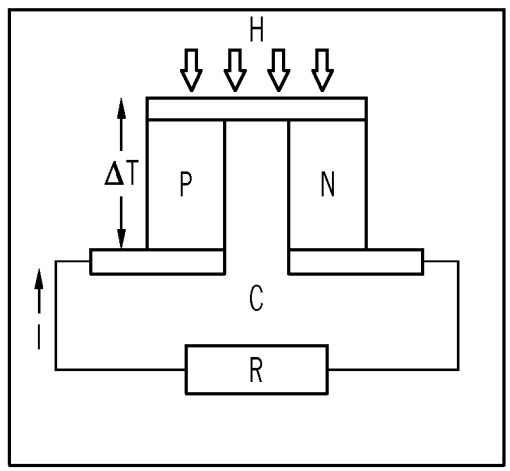
FIG. 3A is a schematic of a thermoelectric element with p- and n-type legs, that produces electrical power in a temperature gradient.
Figure 3B:
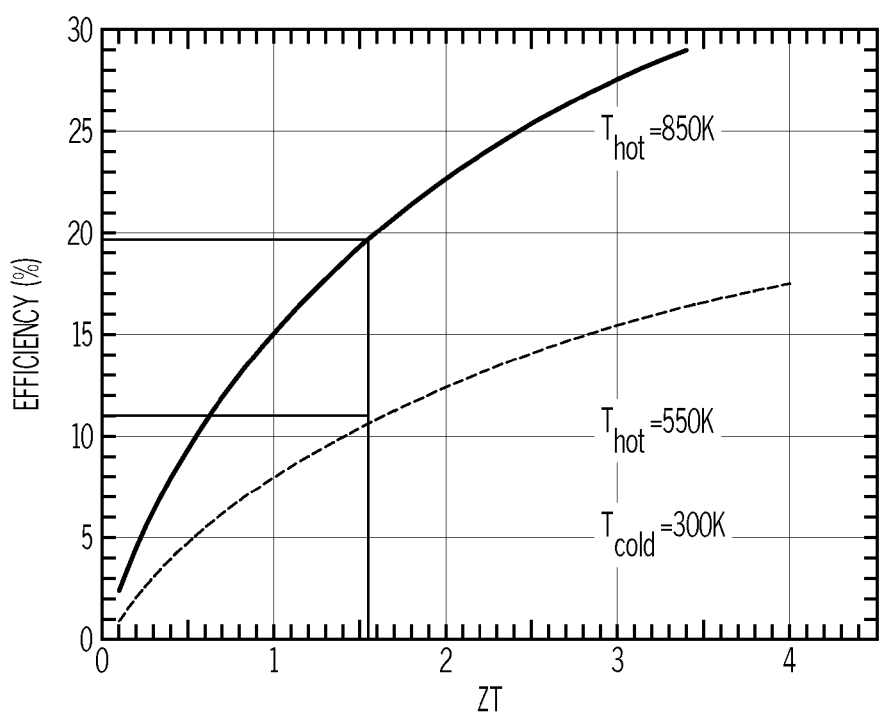
FIG. 3B is a plot of thermoelectric efficiency versus the Figure of Merit (ZT) for two different hot-side temperatures and one fixed cold-side temperature.

As illustrated with reference to FIG. 3A, an exemplary thermoelectric generation element (e.g., that includes interconnected n-type and p-type semi-conductors) may be a primary component of a thermoelectric generator. A thermoelectric generation couple is built, for example, of an assembly of interconnected p-type legs and n-type legs composed of p-type and n-type thermoelectric materials (e.g., n-type and p-type semi-conductors). As shown in FIG. 3A, when the thermoelectric generation couple is exposed to a heat source H and a heat sink C that create a temperature gradient ΔT across the thermoelectric generation couple, a current I flows clockwise around the circuit and through resistor R. A plot of the efficiency of converting heat into electricity as a function of the Figure of Merit ZT is illustrated in FIG. 3A. As shown in FIG. 3A, for a material having a ZT value of about 1.5, the conversion efficiency is about 10% for a temperature gradient of about 250 K (i.e., $T_{hot}-T_{cold}$=550 K−300 K=250 K) and about 20% for a temperature gradient of about 550 K (i.e., $T_{hot}-T_{cold}$=850 K−300 K=550 K).

Figure 4:
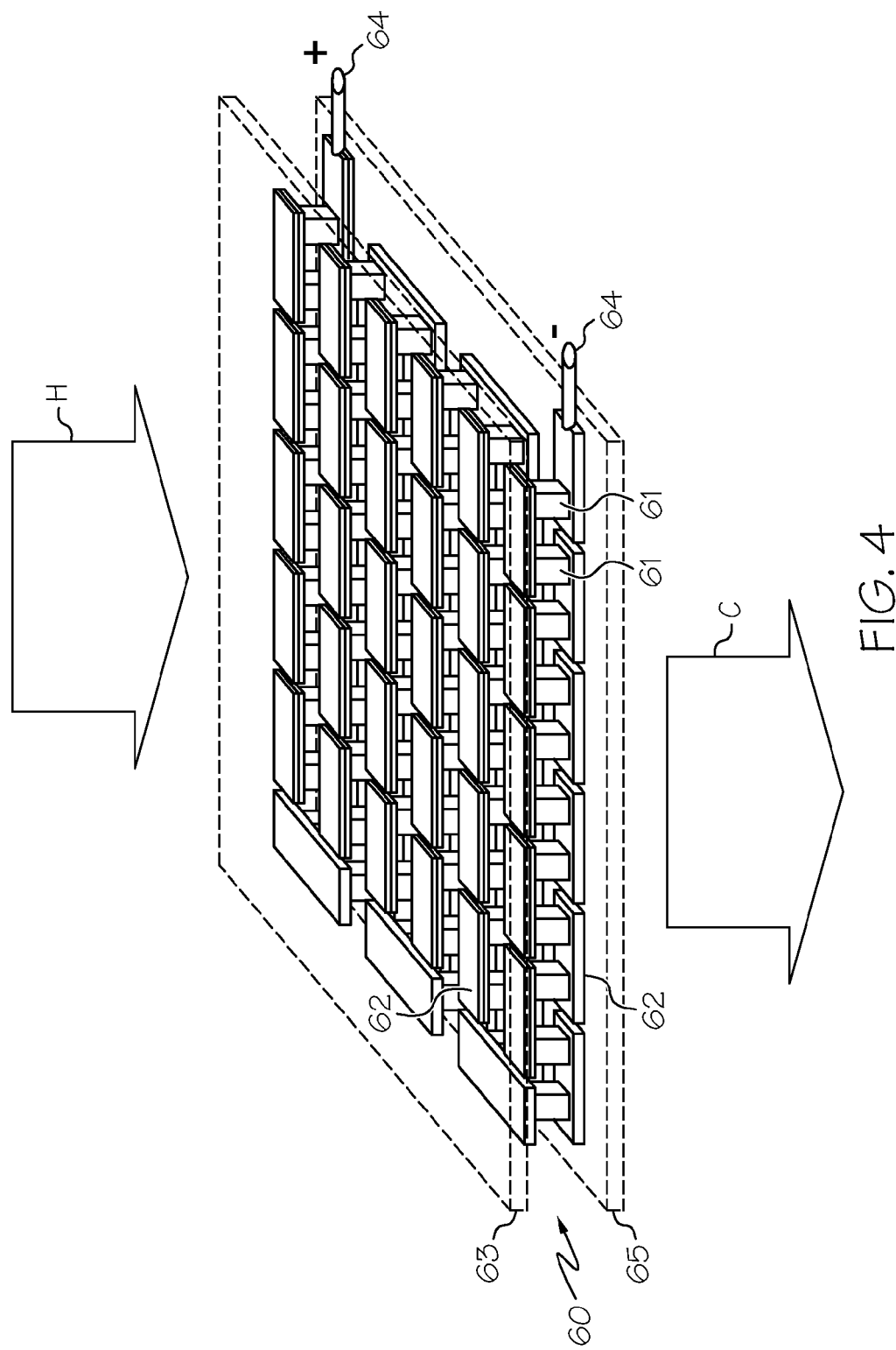
FIG. 4 is a schematic showing an exemplary plate-type thermoelectric generator module.

Various shapes and arrangements of thermoelectric legs have been proposed for integrating thermoelectric materials and components into a thermoelectric generator. For example, one exemplary thermoelectric generation module is illustrated in FIG. 4. As shown in FIG. 4, a thermoelectric module 60 may be built between plates 63 and 65, respectively located on a hot side H and cold side C of the module 60 (e.g., as respectively shown by arrows H and C, heat may be absorbed through the top surface of plate 63 and may be ejected through the bottom surface of plate 65). Plates 63 and 65 may, thereby, act respectively as the heat source and heat sink for the module 60. Alternating p-type legs and n-type legs 61 are interconnected in series by metal interconnects 62 on both the hot and cold sides of the module 60, so that the total voltage of the module 60 is made available at end leads 64. Instead of the simple plates 63 and 65 shown in FIG. 4, in embodiments a thermoelectric generator may generally contain efficient heat exchangers that promote efficient heat exchange between the hot and cold sources.

As above, in various exemplary embodiments, a substrate (e.g., a catalytic substrate or particulate filter substrate) may comprise a variety of materials, including materials having a relatively high thermal conductivity and/or materials having a relatively low thermal conductivity. In embodiments, a substrate may comprise a metallic material having a thermal conductivity in the range of about 20 W/mK to about 25 W/mK. In additional embodiments, a substrate may comprise a ceramic material having a thermal conductivity in the range of about 0.5 W/mK to about 20 W/mK. In other embodiments, the substrate may also include a trough structure, wherein the overall thermal conductivity is reduced compared to the bulk dense material conductivity. Compared to honeycomb filters with a main axial gas flow component and negligible radial gas flow component, radial trough and multicrown designs enable a strong radial gas flow component, which makes the temperature distribution in the radial direction homogeneous and allows it to redistribute and equilibrate heat in the radial direction. While radial heat flux in a honeycomb is mainly provided by heat conduction through the material walls, the wall thickness and wall material restrict radial heat transport and render such a design inefficient for heat extraction. The trough filter design, on the other hand, with its strong radial gas flow component, offers significantly-improved heat transport in the radial direction, which facilitates the use of low thermal conductivity, high porosity oxide ceramic materials and thin wall configurations in devices capable of efficient heat extraction from exhaust gas.

Figure 5A:
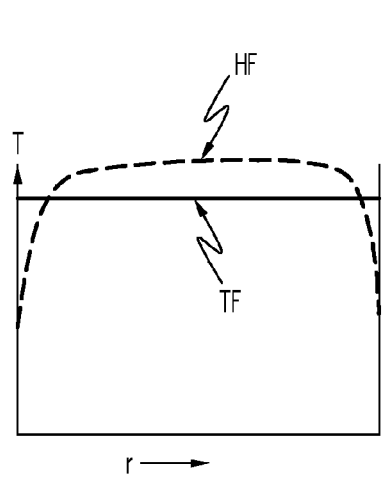
FIG. 5A is a schematic showing the temperature distribution (T) across the transverse direction (r) of honeycomb (HF) and trough (TF) substrates or filters during normal operation.
Figure 5B:
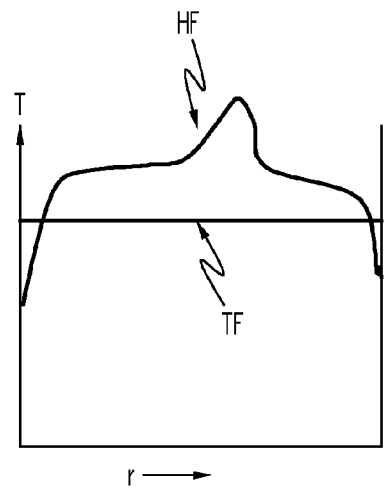
FIG. 5B is a schematic showing the temperature distribution (T) across the transverse direction (r) of honeycomb (HF) and trough (TF) substrates or filters during regeneration.

The temperature distribution within a substrate (e.g., a catalytic substrate or particulate filter substrate) may be a function of a number of parameters. For catalytic substrates, the substrate temperature (and temperature profile) may be a function of the type of engine, the type of fuel, the configuration of the after-treatment system, and various other factors. As depicted in FIG. 5A, the temperature distribution profile of a trough substrate or filter (TF) design may be quite homogenous during normal operation compared to the temperature distribution profile of a honeycomb substrate or filter (HF) where the temperature could be several hundred degrees cooler at the periphery compared to the core. In FIGS. 5A and 5B, T indicates temperature and r indicates a transverse distance in the temperature distribution profile. For efficient operation of the catalytic substrate, desired operational parameters include a substantially homogeneous temperature distribution across the substrate, flow homogeneity, and fast light off. The transverse (e.g., radial for the substrate configuration of FIG. 5A) temperature gradient of a honeycomb structure may therefore result in a less efficient use of the catalyst in the outer, colder periphery of the substrate in the case of a catalytic substrate, or lead to overheating of the catalyst and substrate compared to the needed operation temperature. A trough design substrate (TF) may offer a much more homogeneous radial temperature distribution, as shown in FIG. 5A, and overcome the disadvantages associated with the honeycomb substrate's (HF) low radial thermal flow.

In an un-catalyzed particulate filter substrate, such as for example a DPF substrate or a GPF substrate, where the temperature may typically be a function of the location of the filter within the exhaust system, the average substrate temperature may be less than the average catalytic substrate temperature. A DPF substrate, for example, may operate in two principal regimes, a normal operating regime (i.e., a base temperature for either catalyzed or un-catalyzed filters as shown in FIG. 5A) and a regeneration regime (as shown in FIG. 5B). During filter regeneration, temperatures may peak due to an exothermal soot oxidation reaction, for example. For honeycomb filters (HF), due to the low thermal conduction in the radial filter direction, the filter's core temperature may be several hundred degrees higher than the temperature at the periphery, and result in a strong radial temperature gradient. Trough-based filters (TF) have a strong radial gas flow component and therefore produce only moderate temperature increase during regeneration. Thus, as shown in FIG. 5B, the overall temperature gradient remains very homogeneous over the regeneration period and allows use of the trough filter as a very constant heat source. In contrast, localized high peak temperatures occur during regeneration of DPF with a honeycomb design. These temperature peaks limit the DPF operation range and may require a bypass valve that avoids conducting the hot gas through the TEG if the peak temperature is higher than the thermoelectric material, or higher than any TEG component material stability limit. The trough design DPF may offer the advantage of not needing such a by-pass because the temperature is more homogeneous compared to a honeycomb filter, as shown in FIG. 5B, and more heat energy can be captured without by the TEG without difficulty. For these same reasons, trough filters also allow use of thermoelectric materials that are efficient at low temperature, but have limited temperature stability.

Transverse temperature gradients in both honeycomb catalytic substrates and honeycomb particulate filters may, therefore, limit the operational window of low thermal conductivity filters. One approach to decreasing the temperature gradient is to use higher thermal conductivity materials for the substrate or filter. In accordance with embodiments of the present disclosure, the radial temperature gradient in a substrate or filter may also be decreased by using a trough-based substrate or filter design with a strong radial gas flow component. Integrating one or more thermoelectric generation elements within the multicrown trough structure may allow strongly enhanced heat extraction at a very homogeneous radial temperature and thus allow more efficient waste heat recovery within the vehicle.

Figure 6:
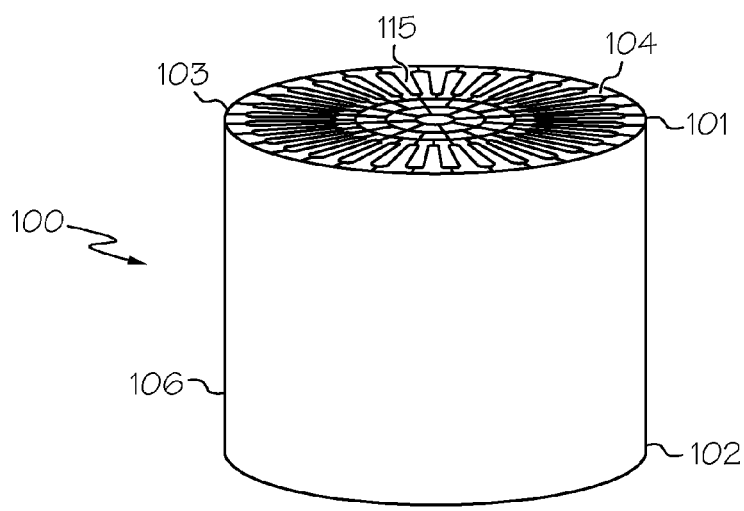
FIG. 6 is a schematic showing an after-treatment device.

As illustrated in FIG. 6, an after-treatment device 100 may comprise a substrate 106 having a first end 101, a second end 102, and an outermost lateral dimension 103, defining an interior volume 104. As used herein the term "interior volume" refers to the volume bounded by the outermost lateral dimension. As explained above, when placed within an after-treatment system, the substrate 106 may be configured to flow exhaust gas through the interior volume 104 from the first end 101 to the second end 102. In embodiments, for example, the substrate is a structure comprising a plurality of trough channels 115 that permit the flow of exhaust gas through the trough channels 115 from the first end 101 to the second end 102. In an exemplary embodiment, the substrate comprising channels has a through-based design; however, the channels may have a variety of arrangements and configurations (e.g., cross-sections) without departing from the scope of this disclosure.

Figure 7:
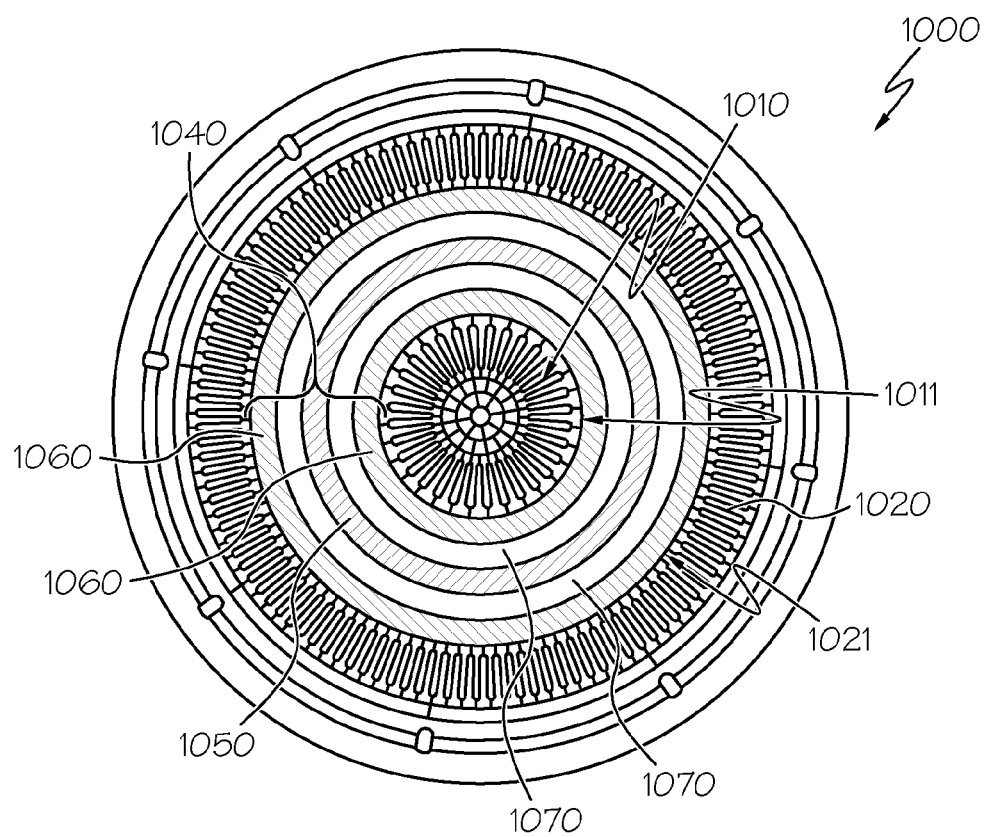
FIG. 7 is a schematic cross section of a trough filter including an integrated thermoelectric generator that includes the thermoelectric device and a heat exchanger according to embodiments of the present disclosure.

Referring now to FIG. 7, in embodiments, an after-treatment device may be a filter 1000, such as a radial-flow trough filter. The trough filter may have any number of concentric, annular filter modules (e.g., 1010 and 1020) suitable for the desired size and desired use of the filter. For example, the filter may have at least 2 concentric filter modules, such as 3, 4, 5, 6, 7, or more concentric filter modules. The diameters of the concentric filter modules may increase as their distance from the center axis of the radial flow filter increases. Accordingly, the outer diameter 1011 of each concentric filter module may be less than the inner diameter 1021 of concentric filter modules that are further from the central axis of the radial flow filter. In embodiments, an annular gas channel (not shown) may be positioned between adjacent filter modules (such as, for example, between filter elements 1010 and 1020). The annular gas channel may be formed by allowing a gap to exist between adjacent filter modules. The number of annular gas channels is not particularly limited, and may be modified according to the design parameters of the system. However, in embodiments, the number of annular gas channels satisfies the following relationship: $G \leq n-1$, where G represents the number of annular gas channels and n represents the number of filter modules in the radial flow filter.

In embodiments, the filter modules of the radial flow filter may comprise a first support structure at its inner circumference, a second support structure at its outer circumference, and a filter element positioned between the first support structure and the second support structure. The filter element may be positioned between the first support structure and the second support structure such that the filter element divides the filter module into a gas inlet and a gas outlet. The filter element may be porous and may allow gas to pass from the inlet side of the filter module through the porous filter element and into the outlet side of the filter module. As the gas passes through the porous filter element, particulates may be removed from the gas, thereby providing a clean gas stream to exit the filter module through the outlet side. To increase the surface area of the filter element in the filter module, the filter element may be configured in various geometric patterns. For example, in embodiments, the filter element may be configured to have a sinuous shape, thereby creating inlet troughs and outlet troughs having a sinuous shape. It should be understood that other geometries may be used to increase the surface area of the filter element by forming troughs within the filter module. The troughs in the trough filters and substrates may have different trough wall thickness, different geometry and different radial and circular interspacing. The support structures and the filter element of the filter module may be made of the same or different materials. In embodiments, the support structures and the filter element of the filter module may comprise a catalyst, particulate filter material, or thermoconductive materials.

According to embodiments, a thermoelectric generator 1040 may be positioned in thermal communication with any annular exhaust gas inlet or outlet channel. For example, a thermoelectric generator 1040 may be positioned between and connected to two adjacent filter elements 1010 and 1020 and/or in the annular exhaust gas inlet or outlet channel. In some embodiments, the thermoelectric generator 1040 connected to the adjacent filter elements 1010 and 1020 by direct, physical contact. In other embodiments, the thermoelectric generator 1040 may be connected to the adjacent filter elements 1010 and 1020 via a thermal transfer medium or an adhesive layer. The thermoelectric generator may include a cold-side heat exchanger 1050, thermoelectric modules 1070, and hot-side heat exchangers 1060. As shown in FIG. 7, the cold-side heat exchanger 1050 may be connected to the thermoelectric modules 1070. Each hot-side heat exchanger 1060 may be connected to a thermoelectric module 1070. It should be recognized that the cold-side heat exchanger 1050, the thermoelectric modules 1070, and the hot-side heat exchangers 1060 may be connected to each other by any mechanism such as, for example, via direct, physical contact, via a thermal transfer medium, or via an adhesive layer. The thermal transfer medium may be formed from any type of conforming, thermally conductive substance. The thermal transfer medium may serve, for example, to conform to the surfaces of the thermoelectric module 1060 and the cold-side and hot-side heat exchangers 1050 and 1060, respectively, to effectively enhance thermal transfer from the heat source or cooling source to the thermoelectric generation module. Suitable thermal transfer materials may comprise materials having a low electrical conductivity and a high thermal conductivity, including, for example, metallic foams, nets, and metal-ceramics. It should also be recognized that the above configuration may be repeated as many times as desired.

In embodiments, the thermoelectric generator may be separated from the filter module by a thin, pliable ceramic with high thermal conductivity, such as alumina, mullite, aluminosilicate, aluminum titanate, or other thin and fibrous ceramic paper. These materials may allow easy heat transfer and mounting of the thermoelectric generator to the filter element. In further embodiments, the hot-side heat exchanger 1060 and the cold-side heat exchanger 1050 may be made of any known and suitable material. For example, in embodiments, the cold-side and hot-side heat exchangers may comprise aluminum, or other metallic cold side heat exchanger materials, and/or ceramics, such as SiC, SiAlON, or others, depending on the hot side temperature.

Figure 8:
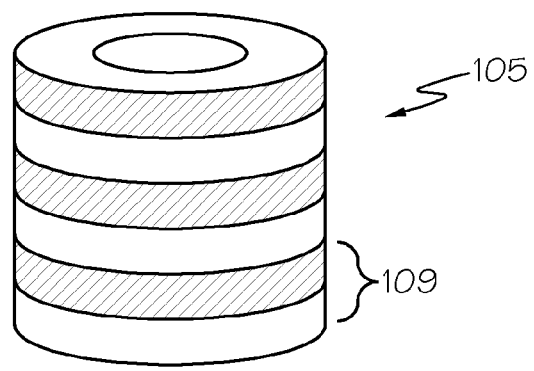
FIG. 8 shows an example embodiment of thermoelectric generator element patterns according to embodiments of the present disclosure.

According to embodiments, the thermoelectric module may include a stack of alternating n-type and p-type rings. As shown in FIG. 8, a thermoelectric generator 105 may comprise a stack of n-type and p-type rings of small or large diameter, depending on the diameter of the interspace in the trough filter or substrate where they are introduced, although it should be recognized that other configurations of n-type and p-type material may be used in accordance with various embodiments of this disclosure or the claims. The n-type rings and p-type rings may be separated from each other. Suitable separating layers may be made, for example, from a low thermal conductivity, low electrical conductivity material, such as, for example, a ceramic or glass-ceramic foam, coating or interlayer.

Figure 9A:
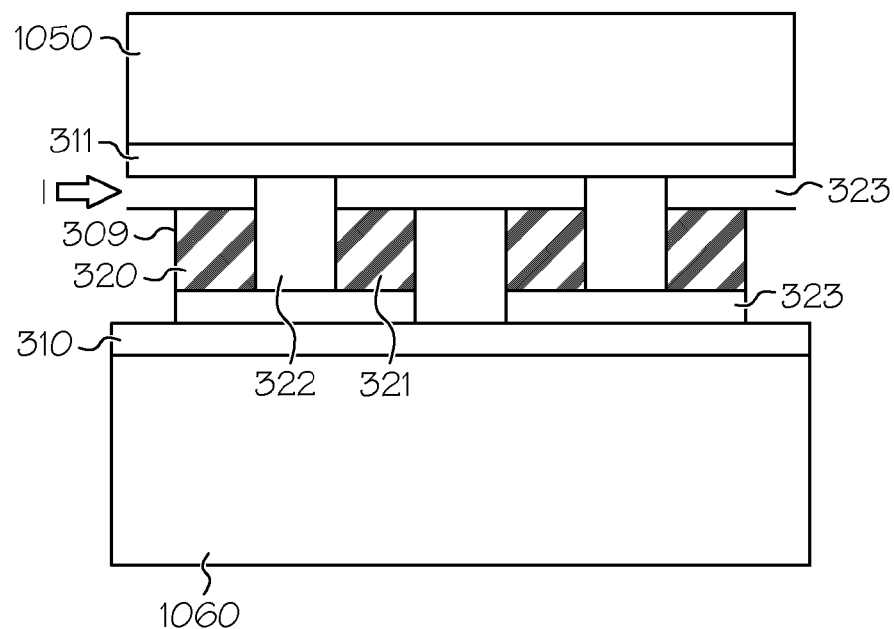
FIGS. 9A and 9B are schematics showing electrical interconnections among a plurality of thermoelectric generator devices.
Figure 9B:
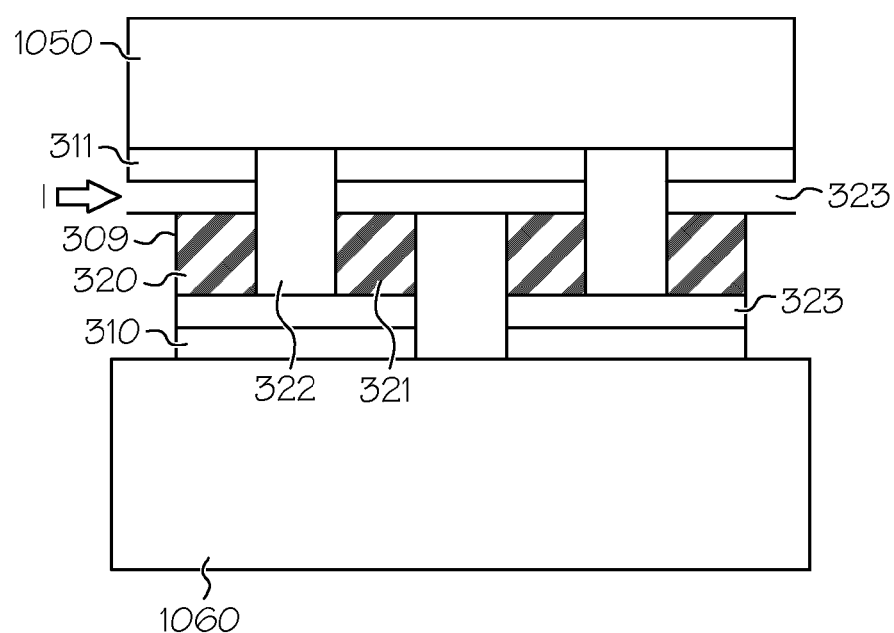

As shown in FIGS. 9A and 9B, an electrically insulating heat transfer layer 310 (i.e., a thermal transfer medium) may separate the thermoelectric generation elements 309 from the hot-side heat exchanger 1060, and an electrically insulating layer 311 may separate the thermoelectric generation elements 309 from the cold-side heat exchanger 1050. In embodiments, for example, the insulating layers 310 and 311 may be patterned to also separate current collectors 323 on one or both of the hot side and cold side. The current flowing through the current collectors 323 is depicted by the arrow and reference label I in FIGS. 9A and 9B. An air, gas, or vacuum space 322 may separate the n-type components 320 from the p-type components 321. As shown in FIG. 9A, in various embodiments, the space 322 may be lined with an electrically insulating material (i.e., insulating layers 310 and 311 are contiguous). Alternatively, as shown in FIG. 9B, in various additional embodiments, the current collectors 323 may be coated with an electrical insulating material (i.e., insulating layers 310 and 311 are not contiguous and match the dimensions of the respective current collectors 323). In particulate filter substrate embodiments, lining spaces 322 with an electrically insulating material (FIG. 9A) that is also impervious to particulates, may improve the thermoelectric generator function. Such a configuration, for example, may prevent conducting particulates contained in the exhaust gas from gathering immediately adjacent to the thermoelectric generation elements (which could burn during a regeneration event) and possibly create short-circuits between the thermoelectric generation elements or current collectors, and/or cause chemical and/or thermal harm to the thermoelectric generation elements.

In embodiments, the current collectors 323 may have various configurations and may be formed from various conductive materials including, for example, metals, alloys, conductive oxides and/or other conductive ceramics. Furthermore, the thermoelectric generation elements 309 may have various shapes, configurations, and/or patterns and be formed from various thermoelectric materials, including, for example, skutterudite-based thermoelectric materials, lead telluride, silicides, silicon-germanium alloys, etc., and that the configuration and material used for the thermoelectric generation elements 309 may be chosen as desired based on thermal efficiency (i.e., ZT value), cost, and other such factors.

As noted previously with respect to FIGS. 5A and 5B, a trough substrate or filter may demonstrate only a slightly higher temperature in its core than at its periphery. Such radial transverse thermal gradients may introduce stress within a substrate and limit its thermo-mechanical durability and operation window. Accordingly, in embodiments, the temperature gradients across the trough substrate or filter and, hence, the thermally-generated stress, in a TEG operation mode may be used to reduce temperature gradients across the substrate or filter and enhance the durability by locating one or more thermoelectric generation elements and/or coolant flow in the hottest region of the substrate. In such a configuration, the cooling effect of the cooling circuit (i.e., the heat sink) may reduce the core temperatures and could be used via a smart control based on temperature feedback to enhance the temperature homogeneity across the substrate. In another operation example, and referring to FIG. 7, thermoelectric heat generation would be targeted to reduce the vehicle's fuel consumption and $CO_2$ emission. In such an example, generation elements may be proximate a cold-side heat exchanger 1050 and coolant flow may run in an axial direction in a cooling circuit near a surface of the cold-side heat exchanger, and the cooling circuit may be in thermal communication with the thermoelectric generator module. Heat is then extracted from the after-treatment device at the location of the thermoelectric generator at a rate and level which is given by the rate and level the exhaust gas is supplying heat, by the thermal conductivity of the filter or substrate, the thermoelectric generator and the heat exchangers.

In embodiments, the thermoelectric generation elements may be configured to cool the substrate. In embodiments, for example, coolant flow adjacent to, or through circuits within, the thermoelectric generation elements may be used to control the thermoelectric generator in response to the temperature of the substrate. For example, in embodiments, an after-treatment device may further comprise at least one temperature sensor that may be configured to measure a temperature of the interior volume, and the coolant flow may be adjusted (increased or decreased) in response to the measured temperature. In embodiments, for example, the coolant flow may be adjusted in response to a regeneration event associated with a particulate filter substrate. In various additional embodiments, the coolant flow in the catalytic convertor may be adjusted to preserve a threshold temperature for the catalytic activity. In still further embodiments, to auto-regulate the amount of heat pulled from the substrate, a thermoelectric material with a steep step function in its ZT performance with temperature can optionally be applied to allow for a threshold response.

A number of approaches may be used to form the gaps within the substrate or filter for the package of heat exchangers and TEG. Cylindrical holes with some material cross-legs to ensure mechanical stability of the substrate or filter may be formed while forming the substrate or filter in an extrusion process with a suitable extrusion die that is designed to provide the cylindrical gap space between two crowns in the multicrown trough pattern in the size required for the heat exchangers and thermoelectric generator. In other embodiments, the substrate or filter may be formed and the cylindrical hole may be drilled into the formed substrate.

In further embodiments, the heat exchangers and/or coolant channels may also be directly formed by extrusion together with the substrate or filter. For example, a heat exchanger of cylindrical geometry with or without fins may be formed by extrusion. A coolant channel with a gap for coolant to flow can also be extruded.

The thermoelectric generator efficiency (i.e., its extraction of heat from the DPF, GPF, or catalytic converter) may be controlled and changed over wide ranges by the flow rate of the coolant through the cooling circuit. Thus, DPF, GPF, or substrate operation feedback may be used, and based on the measured temperature, the coolant flow rate may be adjusted. The adjustment may be made, for example, by a valve or automated controller, as would be understood. A thermoelectric generator could regulate temperature in a DPF, GPF, or catalytic converter, such as by controlling the flow of a coolant as discussed above. With such technology, high soot mass limits may be met for very high porosity parts or for thin-walled parts. This design may allow cordierite and aluminum titanate DPF to compete with high conductivity SiC filters.

Figure 10:
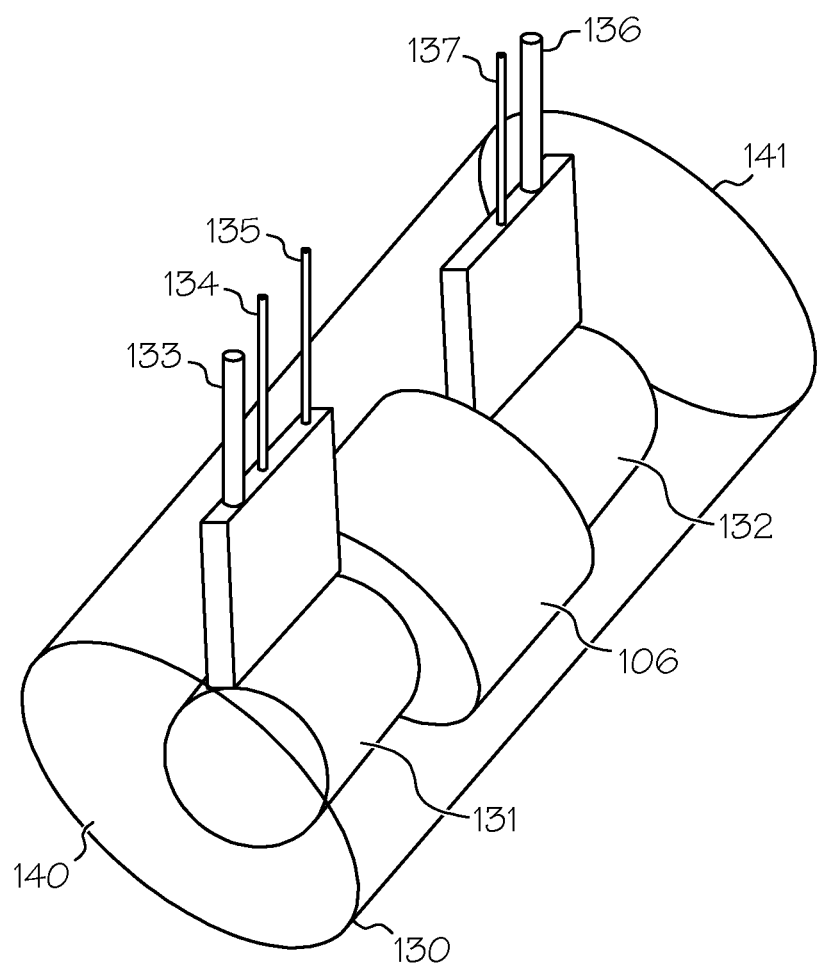
FIG. 10 is a schematic showing a fitting configuration for an after-treatment device having an integrated thermoelectric generator.

As illustrated in FIG. 10 and also with reference to elements in FIGS. 6 and 8, in embodiments, an after-treatment device, such as the after-treatment device 100 in FIG. 6, may further comprise a housing, such as, for example, an exhaust gas container 130 that contains the substrate 106. Accordingly, in embodiments, when the substrate 106 is housed within the container 130, thermoelectric generation elements 109 (e.g., comprising the thermoelectric generator 105) of FIG. 8 are disposed entirely within the container 130. Thus, to reach the thermoelectric generator 106, as shown in FIG. 10, connections within an inlet fitting 131 and an outlet fitting 132 may breach the container 130 radially, or at an inlet 140 and/or outlet 141 of the container 130. The inlet fitting 131 may comprise, for example, a coolant inlet tube 133, a wire 134 for current in and control wiring 135 (if needed), and the outlet fitting 132 may comprise a coolant outlet tube 136 and a wire 137 for current out. In embodiments, wires 134, 135 and 137 may be thermally and electrically insulated using the fittings 131 and 132.

As those of ordinary skill in the art would understand, for embodiments with multiple cylindrical channels, multiple fittings may be used, with the possibility of manifold inlets and/or outlets.

In various additional exemplary embodiments, the disclosure relates to methods for treating exhaust gas using the after-treatment devices described herein, such as, for example, using the after-treatment device of FIG. 7. More specifically, a method for dispensing exhaust gas may comprise flowing the exhaust gas through a trough filter with an integrated thermoelectric generator 1000. The exhaust gas may be flowed through multiple concentric troughs 1010 and 1020 and through an annular exhaust gas outlet channel between one or more of the multiple concentric troughs 1010 and 1020. The exhaust gas may also be flowed through thermoelectric generator 1040 positioned in thermal communication with the annular exhaust gas outlet channel.

Depending on a particular application, in various embodiments, the method may further comprise reacting the flowing exhaust gas with a catalyst incorporated within the substrate 106, or filtering the flowing exhaust gas within the substrate 106.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that terms like "commonly" when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

What is claimed is:

1. A trough filter or substrate integrated with a thermoelectric generator, wherein:
the trough filter comprises:
a first annular filter module comprising a first support structure at its inner circumference, a filter element, and a second support structure at its outer circumference; and
a second annular filter module comprising a third support structure at its inner circumference, a filter element, and a fourth support structure at its outer circumference, wherein
the filter elements are configured to form troughs,
the first and second filter modules are concentric,
an inner diameter of the second filter module is larger than an outer diameter of the first filter module, and
an annular exhaust gas outlet or inlet channel is formed between the first filter module and the second filter module by providing a gap between the second support structure and the third support structure; and
the thermoelectric generator is positioned in the exhaust gas outlet or inlet channel and the thermoelectric generator comprises:
a first heat exchanger connected to the second support structure;
a second heat exchanger;
a first thermoelectric module positioned between the first heat exchanger and the second heat exchanger;
a third heat exchanger connected to the third support structure; and
a second thermoelectric module positioned between the second heat exchanger and the third heat exchanger.

2. The trough filter or substrate of claim 1, wherein at least one of the filter elements comprises a porous material.

3. The trough filter or substrate of claim 1, wherein at least one of the filter elements comprises a catalyst.

4. The trough filter or substrate of claim 1, wherein the trough filter or substrate comprises a member selected from the group consisting of cordierite, silicon carbide, silicon nitride, aluminum titanate, eucryptite, mullite, calcium aluminate, zirconium phosphate, and spodumene.

5. The trough filter or substrate of claim 1, wherein the first heat exchanger is connected to the second support structure by direct, physical contact, and the third heat exchanger is connected to the third support structure by direct, physical contact.

6. The trough filter or substrate of claim 1, wherein the first heat exchanger is connected to the second support structure via a thermal transfer medium, and the third heat exchanger is connected to the third support structure via a thermal transfer medium.

7. The trough filter or substrate of claim 1, wherein the thermoelectric generator is exposed to a fluid that flows through the trough filter.

8. The trough filter or substrate of claim 1, wherein the thermoelectric generator is not exposed to a fluid that flows through the trough filter.

9. The trough filter or substrate of claim 1 further comprising a cooling circuit that is in thermal contact with the thermoelectric generator.

10. The trough filter or substrate of claim 1, wherein the thermoelectric generator is configured to cool inner dimensions of the trough filter.

11. The trough filter or substrate of claim 1 further comprising at least one temperature sensor configured to measure a temperature of inner dimensions of the trough filter.

12. The trough filter or substrate of claim 1, wherein the thermoelectric generator comprises a plurality of n-type components and a plurality of p-type components.

13. The trough filter or substrate of claim 12, wherein the n-type and p-type components are alternating n-type rings and p-type rings.

14. A vehicle comprising an internal combustion engine, a trough filter or substrate integrated with a thermoelectric generator, and an exhaust gas outlet or inlet running from the internal combustion engine through the trough filter, wherein:
the trough filter or substrate integrated with the thermoelectric generator is positioned downstream from an exhaust manifold of the internal combustion engine;
the trough filter or substrate separates particulate from the exhaust gas;
the trough filter or substrate comprises:
a first annular filter module comprising a first support structure at its inner circumference, a filter element, and a second support structure at its outer circumference; and
a second annular filter module comprising a third support structure at its inner circumference, a filter element, and a fourth support structure at its outer circumference, wherein
the filter elements are configured to form troughs,
the first and second filter modules are concentric,
an inner diameter of the second filter module is larger than an outer diameter of the first filter module, and
an annular exhaust gas outlet or inlet channel is formed between the first filter module and the second filter module by providing a gap between the second support structure and the third support structure; and
the thermoelectric generator is positioned in the exhaust gas outlet or inlet channel and the thermoelectric generator comprises:
a first heat exchanger connected to the second support structure;
a second heat exchanger;
a first thermoelectric module positioned between the first heat exchanger and the second heat exchanger;
a third heat exchanger connected to the third support structure; and
a second thermoelectric module positioned between the second heat exchanger and the third heat exchanger.

15. The vehicle of claim 14, wherein the trough filter or substrate is a gasoline particulate filter.

16. The vehicle of claim 15 further comprising an aftertreatment system that comprises:
the gasoline particulate filter; and
at least two three-way catalyst substrates.

17. The vehicle of claim 16, wherein the gasoline particulate filter is positioned between the two three-way catalyst substrates.

18. The vehicle of claim 14, wherein the trough filter or substrate is a diesel particulate filter.

19. The vehicle of claim 18 further comprising an aftertreatment system that comprises:
the diesel particulate filter;
a diesel oxidation catalyst substrate;
a selective catalytic reduction substrate; and
an ammonia slip catalyst substrate or a lean $NO_x$ trap.

20. The vehicle of claim 19, wherein the diesel particulate filter is positioned between the diesel oxidation catalyst substrate and the selective catalytic reduction substrate.

21. A method for converting heat into energy, the method comprising:
flowing hot gas through a trough filter or substrate, wherein the trough filter or substrate comprises:
a first annular filter module comprising a first support structure at its inner circumference, a filter element, and a second support structure at its outer circumference; and
a second annular filter module comprising a third support structure at its inner circumference, a filter element, and a fourth support structure at its outer circumference, wherein
the filter elements are configured to form troughs,
the first and second filter modules are concentric,
an inner diameter of the second filter module is larger than an outer diameter of the first filter module, and
an annular exhaust gas outlet or inlet channel is formed between the first filter module and the second filter module by providing a gap between the second support structure and the third support structure; and
exchanging heat between the flowing exhaust gas and at least one thermoelectric generator that is positioned in the exhaust gas outlet or inlet channel, wherein the thermoelectric generator comprises:
a first heat exchanger connected to the second support structure;
a second heat exchanger;
a first thermoelectric module positioned between the first heat exchanger and the second heat exchanger;
a third heat exchanger connected to the third support structure; and
a second thermoelectric module positioned between the second heat exchanger and the third heat exchanger.

22. The method of claim 21, further comprising reacting the exhaust gas with a catalyst during the flowing through the trough filter or substrate.

23. The method of claim 21, further comprising filtering the exhaust gas during the flowing through the trough filter or substrate.

24. The method of claim 21, further comprising flowing a coolant through a cooling circuit that is in thermal communication with the thermoelectric generator.

* * * * *